US012580417B2

(12) United States Patent
Ren

(10) Patent No.: US 12,580,417 B2
(45) Date of Patent: Mar. 17, 2026

(54) NANOCRYSTALLINE STRUCTURES FOR WIRELESS CHARGING SYSTEMS

(71) Applicant: Apple Inc., Cupertino, CA (US)

(72) Inventor: Saining Ren, Auckland (NZ)

(73) Assignee: Apple Inc., Cupertino, CA (US)

( * ) Notice: Subject to any disclaimer, the term of this patent is extended or adjusted under 35 U.S.C. 154(b) by 880 days.

(21) Appl. No.: 17/849,458

(22) Filed: Jun. 24, 2022

(65) Prior Publication Data

US 2022/0416576 A1     Dec. 29, 2022

Related U.S. Application Data

(60) Provisional application No. 63/214,912, filed on Jun. 25, 2021.

(51) Int. Cl.
| | |
|---|---|
| *H02J 7/00* | (2006.01) |
| *H01F 1/153* | (2006.01) |
| *H01F 27/36* | (2006.01) |
| *H01F 38/14* | (2006.01) |
| *H02J 50/00* | (2016.01) |
| *H02J 50/10* | (2016.01) |
| *H02J 50/70* | (2016.01) |

(52) U.S. Cl.
CPC ........ *H02J 50/005* (2020.01); *H01F 1/15333* (2013.01); *H01F 27/36* (2013.01); *H01F 38/14* (2013.01); *H02J 50/10* (2016.02); *H02J 50/70* (2016.02)

(58) Field of Classification Search
None
See application file for complete search history.

(56) References Cited

U.S. PATENT DOCUMENTS

| | | | |
|---|---|---|---|
| 7,891,528 B2 | 2/2011 | Costa et al. | |
| 7,981,528 B2 | 7/2011 | Nakatani et al. | |
| 10,553,002 B2 | 2/2020 | Armstrong-Muntner | |
| 10,784,030 B2 | 9/2020 | Lee et al. | |
| 11,005,175 B2 | 5/2021 | Lim et al. | |
| 11,159,054 B2 | 10/2021 | Pinciuc et al. | |
| 11,165,273 B2 | 11/2021 | Graham et al. | |
| 2008/0246571 A1 | 10/2008 | Guenther | |
| 2011/0095754 A1* | 4/2011 | Morel | G01R 33/05 29/606 |

(Continued)

FOREIGN PATENT DOCUMENTS

| | | |
|---|---|---|
| CN | 105990002 | 10/2016 |
| EP | 3451495 | 3/2019 |

(Continued)

OTHER PUBLICATIONS

U.S. Appl. No. 17/708,411, filed Mar. 30, 2022.

*Primary Examiner* — Arun C Williams
(74) *Attorney, Agent, or Firm* — YHE Law LLP

(57) ABSTRACT

Implementations described herein provide systems and methods for wireless charging. In one implementation, a base has a planar surface. One or more posts extend from the planar surface of the base to form a core. Each of the one or more posts is formed from a plurality of nanocrystalline sheets. The plurality of nanocrystalline sheets of each of the one or more posts is oriented in planes perpendicular to the planar surface of the base. One or more coils are wound around each of the one or more posts to form coil windings.

20 Claims, 5 Drawing Sheets

(56)          References Cited

U.S. PATENT DOCUMENTS

| | | | |
|---|---|---|---|
| 2011/0293463 A1* | 12/2011 | Branagan | C22C 38/34 |
| | | | 420/95 |
| 2013/0242475 A1 | 9/2013 | Sloey | |
| 2014/0042824 A1 | 2/2014 | Fells et al. | |
| 2014/0327384 A1 | 11/2014 | Asselin et al. | |
| 2014/0374860 A1 | 12/2014 | Suzuki | |
| 2015/0123604 A1* | 5/2015 | Lee | B32B 37/18 |
| | | | 428/307.3 |
| 2015/0280450 A1 | 10/2015 | Park et al. | |
| 2015/0302985 A1 | 10/2015 | Kurs | |
| 2016/0006291 A1* | 1/2016 | Li | H02J 50/12 |
| | | | 320/108 |
| 2016/0057900 A1 | 2/2016 | Polak et al. | |
| 2016/0064814 A1 | 3/2016 | Jang et al. | |
| 2017/0104358 A1 | 4/2017 | Song et al. | |
| 2018/0062417 A1 | 3/2018 | Choi et al. | |
| 2018/0114984 A9 | 4/2018 | Wu et al. | |
| 2019/0148988 A1 | 5/2019 | Hwang | |
| 2019/0363565 A1 | 11/2019 | Graham et al. | |
| 2019/0371519 A1 | 12/2019 | Pang et al. | |
| 2020/0075951 A1 | 3/2020 | Dai et al. | |
| 2021/0050744 A1 | 2/2021 | Qiu et al. | |
| 2021/0398733 A1 | 12/2021 | Moussaoui et al. | |
| 2021/0399577 A1 | 12/2021 | Qiu et al. | |
| 2021/0408826 A1 | 12/2021 | Liu et al. | |
| 2022/0279686 A1 | 9/2022 | Jang | |
| 2022/0416576 A1 | 12/2022 | Ren | |

FOREIGN PATENT DOCUMENTS

| | | |
|---|---|---|
| KR | 10-2011-0129072 | 12/2011 |
| WO | WO 2005/033350 | 4/2005 |
| WO | WO 2020/068389 | 4/2020 |
| WO | WO 2021/247250 | 12/2021 |

* cited by examiner

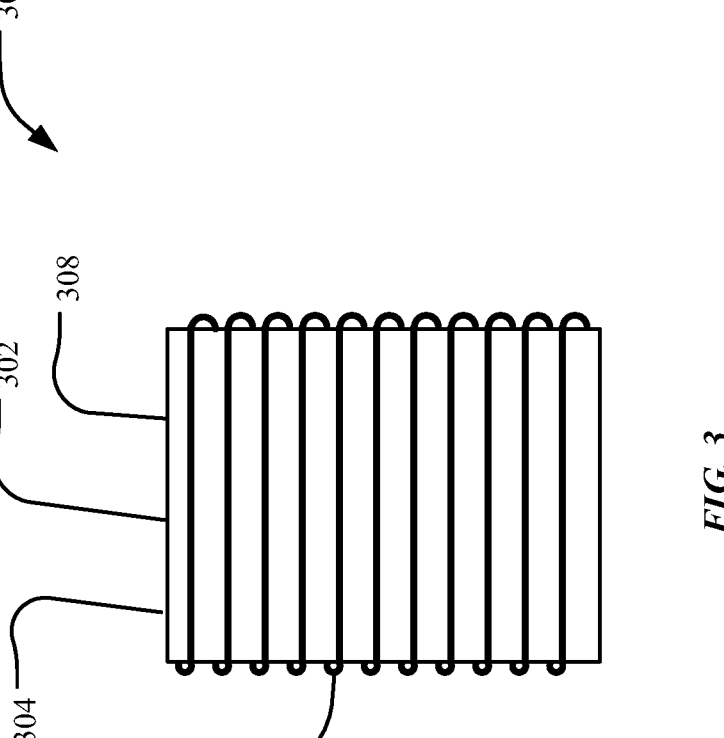
300
302
308
304
306
*FIG. 3*
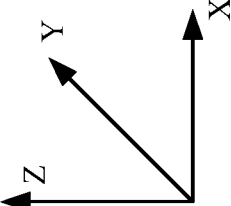

NANOCRYSTALLINE STRUCTURES FOR WIRELESS CHARGING SYSTEMS

CROSS-REFERENCE TO RELATED APPLICATIONS

The present application claims priority to U.S. Provisional Patent Application No. 63/214,912 filed on Jun. 25, 2021, which is incorporated by reference in its entirety herein.

FIELD

Aspects of the present disclosure relate to systems and methods for wireless charging and more particularly to wirelessly charging an accessory using one or more cores with nanocrystalline structures.

BACKGROUND

Many electronic devices, such as smartphones, tablets, and laptop computers, are battery powered. Electronic devices may incorporate wireless charging for recharging the battery without a charging cord. Accessories may be similarly battery powered and charged through wireless charging. For example, an accessory may be charged using a wireless connection between an electronic device and the accessory. However, some wireless charging systems experience energy loss during charging, thereby decreasing charging efficiency.

SUMMARY

Implementations described and claimed herein address the foregoing by providing systems and methods for wireless charging. In one implementation, a base has a planar surface. One or more posts extend from the planar surface of the base to form a core. Each of the one or more posts is formed from a plurality of nanocrystalline sheets. The plurality of nanocrystalline sheets of each of the one or more posts is oriented in planes perpendicular to the planar surface of the base. One or more coils are wound around each of the one or more posts to form coil windings.

In another implementation, an apparatus includes a plurality of nanocrystalline sheets. Each of the plurality of nanocrystalline sheets includes an X-Y planar surface. The plurality of nanocrystalline sheets form a nanocrystalline-based wireless power transfer core. A wireless power transfer coil is wound circumferentially about the nanocrystalline-based wireless power transfer core along X-Z planes perpendicular to the X-Y planar surfaces.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 3 illustrates an example core of the accessory.

DETAILED DESCRIPTION

Aspects of the presently disclosed technology relate to systems and methods for wirelessly charging a wireless power receiving device, such as an accessory. Electronic devices that are battery powered can support wireless charging in alternative or addition to wired charging. Some electronic devices and accessories may be similarly battery powered and charged. In one aspect, an electronic device is configured to provide wireless charging to an accessory. The electronic device includes a wireless charging assembly disposed in the device. The wireless charging assembly includes a core structure having one or more posts extending from a base. This type of structure is sometimes referred to as a pot core. Coil windings are formed by one or more coils wound around the one or more posts. The wireless charging assembly generates a magnetic flux in a direction outward of a surface of the enclosure of the electronic device, providing power wirelessly to an adjacent wireless power receiving device. To mitigate energy loss during wireless charging of the accessory, the one or more posts may be made from nanocrystalline structures, such as a plurality of nanocrystalline sheets stacked on the base. The plurality of nanocrystalline sheets of each of the one or more posts may be oriented in planes perpendicular to a planar surface of the base, enabling wireless charging in a high operating frequency range (e.g. 100 kHz to 400 kHz) with favorable (negligible) eddy current loss. The plurality of nanocrystalline sheets may be formed using iron-based nanocrystalline materials.

Figure 1A:
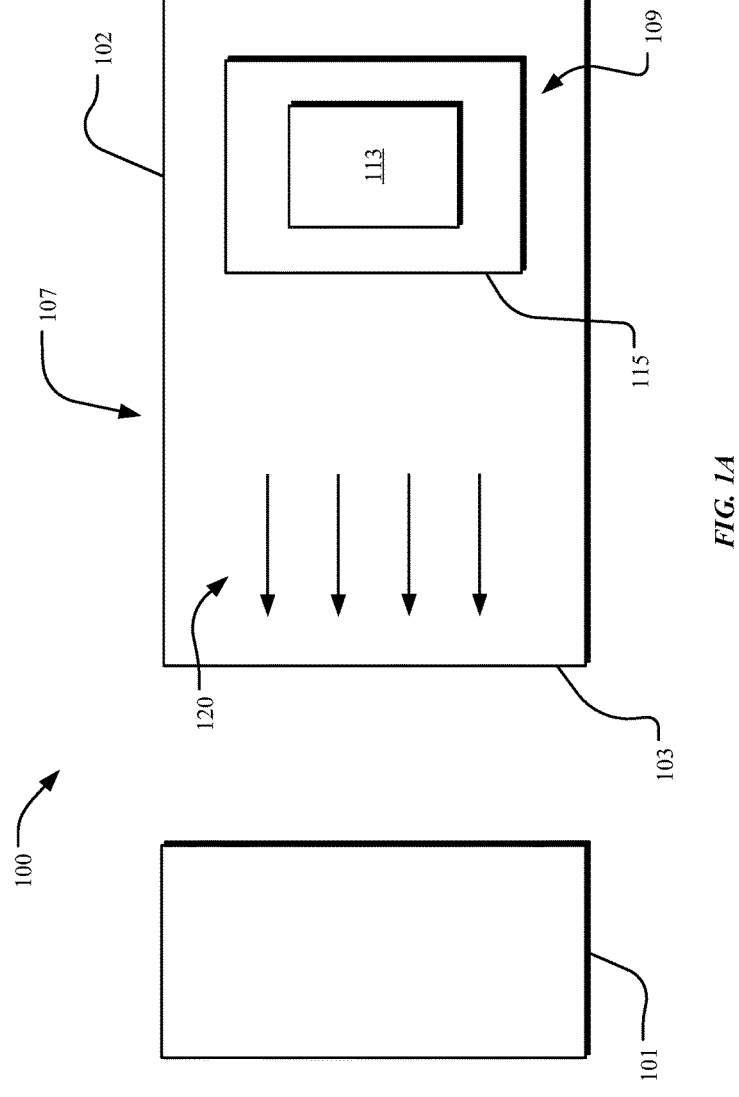
FIG. 1A illustrates an example wireless charging system including an example electronic device for wirelessly charging an example accessory.
Figure 1B:
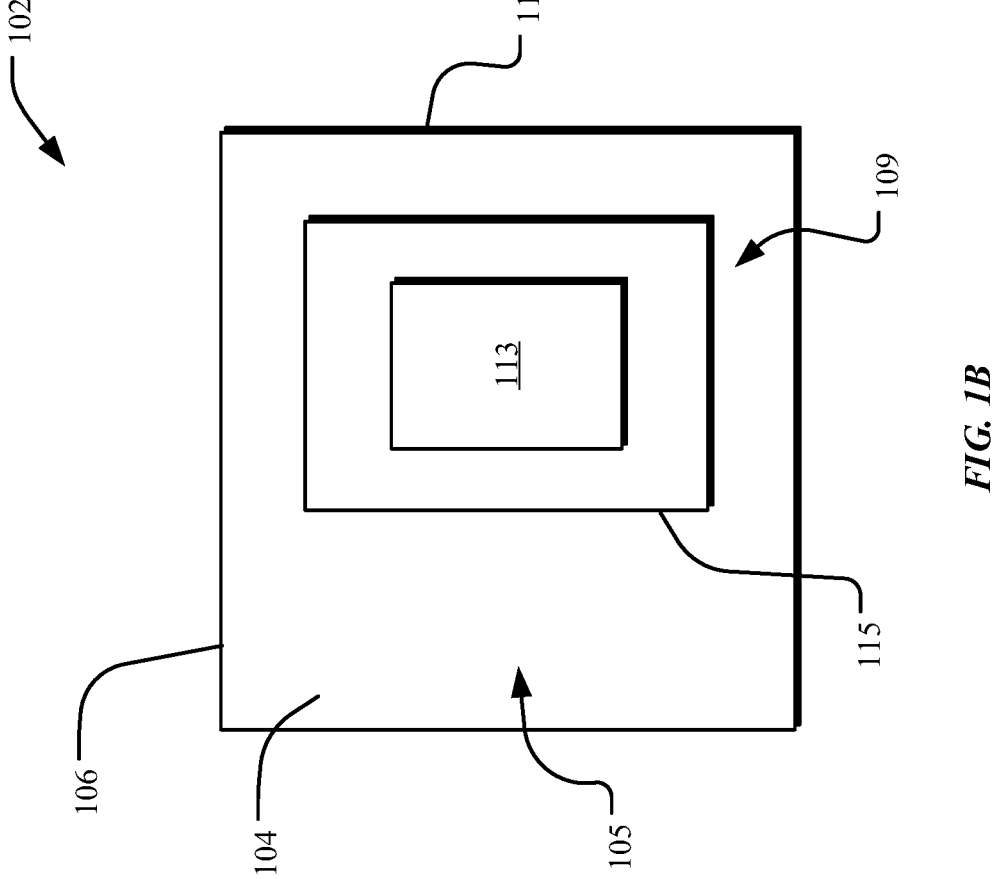
FIG. 1B illustrates a side sectional view of the electronic device of FIG. 1A.

With reference to FIGS. 1A-1B, in one implementation, a wireless charging system 100 includes an electronic device 102 configured to provide power wirelessly to a wireless power receiving device, in this example, an accessory 101. The electronic device 102 may be a tablet, smartphone, laptop, or other computing device designed to perform various functions for a user. The accessory 101 may be used with the electronic device 102 or on its own. The accessory 101 may include, without limitation, a stylus, earbuds, a wearable device (e.g., a smartwatch), and/or the like.

The accessory 101 also includes electrical components that utilize a power source to operate. The power source of the accessory 101 may include a battery for discharging stored energy to power the electrical components of the accessory 101. In one implementation, to replenish energy powering the electrical components of the accessory 101, the electronic device 102 includes a wireless charging assembly 109. More specifically, the wireless charging assembly 109 of the electronic device 102 may include wireless power transmitter disposed in an enclosure 107 defined by one or more peripheral surfaces of the electronic device 102. When the accessory 101 is within a proximity of the electronic device 102, the wireless power transmitter wirelessly recharges the battery of the accessory 101.

The electronic device 102 includes at least one location 103 through which wireless charging is provided to the accessory 101. In one non-limiting example, the electronic device 102 includes a face 105, which may include a surface 104 disposed over a display 106. The surface 104 may be substantially transparent, such that the display 106 is viewable through the surface 104. The surface 104 may be made from glass, plastic, and/or similar material. The display 106 may be a touch-sensitive display, such as a capacitive multi-touch display. The display 106 may include one or more additional layers, including, without limitation, a liquid crystal display, light emitting diode (LED) display, organic LED display, drive electrode layers, sense electrode layers, and/or other layers associated with display or touch sending. The face 105 may be disposed opposite a back 117 and connected with one or more sides. The face 105, the back 117, the one or more sides, and/or the like may be made from a variety of materials, such as glass, metal, plastic, and/or similar material. To the extent metallic materials are used, a suitable opening may be created to facilitate wireless charging. The wireless charging assembly 109 may be disposed in the space defined by these components or otherwise in the enclosure 107 of the electronic device 102. It will be appreciated that components of the electronic device 102 may be sized and arranged to maximize spatial efficiency. However, free space within the enclosure 107 may be provided for cooling and other considerations. It will further be appreciated that the enclosure 107 may take a variety of forms and have various components, surfaces, and/or the like.

In one implementation, the wireless charging assembly 109 includes a core 113. A shield 115, which may be made from a metallic material, such as copper, may be disposed about or otherwise disposed relative to the wireless charging assembly 109. The wireless charging assembly 109 may generate a magnetic flux 120 outward from the location 103 of the enclosure 107 toward the accessory 101. It will be appreciated that the location 103 may be disposed anywhere on the electronic device 102, such that the magnetic flux 120 can be oriented outward from a side, the face 105, the back 117, and/or the like. The magnetic flux 120 may be generated using an inductive power transmitter circuit of the wireless charging assembly 109. Such inductive power transmitter circuits may include a power supply and an inverter that generates an Alternating Current (AC) voltage having a suitable frequency from a power supply of the electronic device 102. When the core 113 is driven with the AC voltage, the magnetic flux 120 delivers energy wirelessly to a wireless power receiver of the accessory 101.

In one implementation, the core 113 includes a base and one or more posts having one or more coil windings. The core 113 may also be other shapes, such as a PQ core. The one or more coil windings may be wound circumferentially around or otherwise disposed on one or more posts of the core 113. However, it will be appreciated that the one or more coil windings may be disposed on another portion of the core 113, such as a portion of the base of the core 113. In one implementation, the one or more coil windings (e.g., wireless power transmitter coils) include a first portion wound in a first direction about a first post of the core 113 and a second portion wound in a second direction about a second post of the core 113. In some implementations the windings have opposite directions, e.g., the first direction may be clockwise and the second direction may be counterclockwise. In some implementations, the windings are in the same direction. Regardless of the direction(s) of the windings, the first post and the second post are configured to have the magnetic flux 120 generated in a same direction at the location 103 when electric current flows through the windings. Further, the wireless charging assembly 109 may include a spacer to provide structural reinforcement to the core 113. The spacer may be bonded to the core 113. For example, the spacer may be disposed between the first post and the second post of the core 113.

In one implementation, the one or more posts are formed from nanocrystalline materials. The posts may include a plurality of stacked nanocrystalline sheets. The nanocrystalline material may be iron-based, providing optimized metallic properties, including a high magnetic permeability, relative to soft ferrites and similar materials. Compatible iron-based nanocrystalline materials include those having a high magnetic field (B) saturation (e.g., greater than 1 Tesla) compared to a soft ferrite material.

The nanocrystalline sheets may be stacked on an X-Y plane formed by a base. In this example, the nanocrystalline sheets extend perpendicularly from the X-Y plane of the base in a Z-direction, normal to the X-Y plane. The nanocrystalline sheets each include an X-Y planar surface with the one or more coil windings wound circumferentially about the core 113 along Y-Z planes perpendicular to the X-Y planar surfaces. As such, the nanocrystalline sheets are aligned with a direction of the magnetic flux 120, with the magnetic flux 120 being substantially in the X-Z plane even with the transmitter of the wireless charging assembly 109 and the wireless power receiver of the accessory 101 are in pair. The resulting nanocrystalline-based core structure of the core 113 provides favorable saturation characteristics, particularly in environments where AC magnetic fields (from wireless charging) and Direct Current (DC) magnetic fields (from nearby permanent magnets) exist.

The resulting nanocrystalline-based core structure also exhibits suitable eddy current loss characteristics at common wireless charging operating frequencies, such as those in the 100-400 kHz range, which includes implementation of the Wireless Power Consortium's Qi wireless power transfer system specification. For example, when the nanocrystalline sheets are oriented in planes perpendicular to the X-Y planar surface of the base, the resulting nanocrystalline-based core structure exhibits favorable (negligible) eddy current loss in the 100-400 kHz range.

Ferrite cores of wireless charging assemblies can experience high eddy current loss under certain wireless power transfer operating conditions. These losses can increase as wireless power transfer operating frequencies increase. For example, wireless power operation at 400 kHz may increase eddy current losses relative to operation at 100 kHz. Operation at higher frequencies, however, can produce other benefits such as increased wireless power transfer efficiency. The core 113 formed from the nanocrystalline sheets exhibits higher in-plane magnetic permeability (e.g., 10,000 H/m or greater) in a plane parallel to the base (e.g., in the X-Y plane), relative to substantially lower through-plane magnetic permeability (e.g., of 10 H/m or less) in a direction perpendicular to the base (e.g., in the Z direction perpendicular to the X-Y plane). As such, the core 113 has favorable (negligible) eddy current loss characteristics as compared to ferrite-based structures under relevant operation conditions.

The core 113 may include configurations including one or more posts or other configurations. For example, referring to FIGS. 2A-2B, an example core configuration 200 of the wireless power transmitter 109 is illustrated. In one implementation, the core configuration 200 includes a core 202 having a first post 202A and a second post 202B. The second post 202B is separated from the first post 202A by a distance 214. One or more coils may be disposed about the posts 202A and 202B. to form coil windings 206. In some examples, the coil windings 206 may be wound about the cross-section of the base 212. In one example, the posts 202A and 202B extend in a same direction from a base 212. The base 212 includes a planar surface on which posts 202A-B are disposed. It will be appreciated that various cores and winding configurations may be used and the core configuration 200 is one non-limiting example.

Figure 2A:
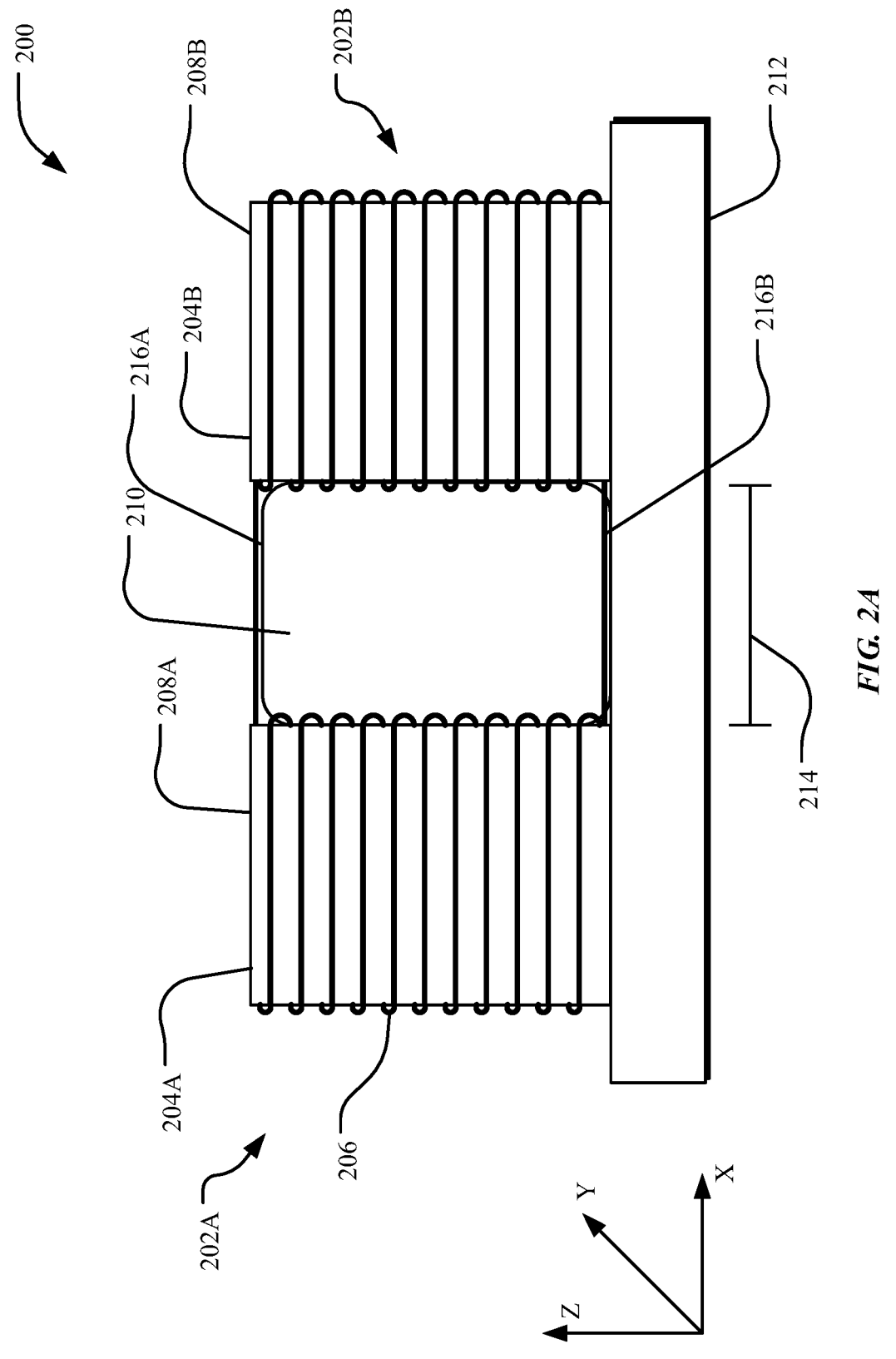
FIG. 2A illustrates a side view of an example core of a wireless charging assembly of the electronic device.
Figure 2B:
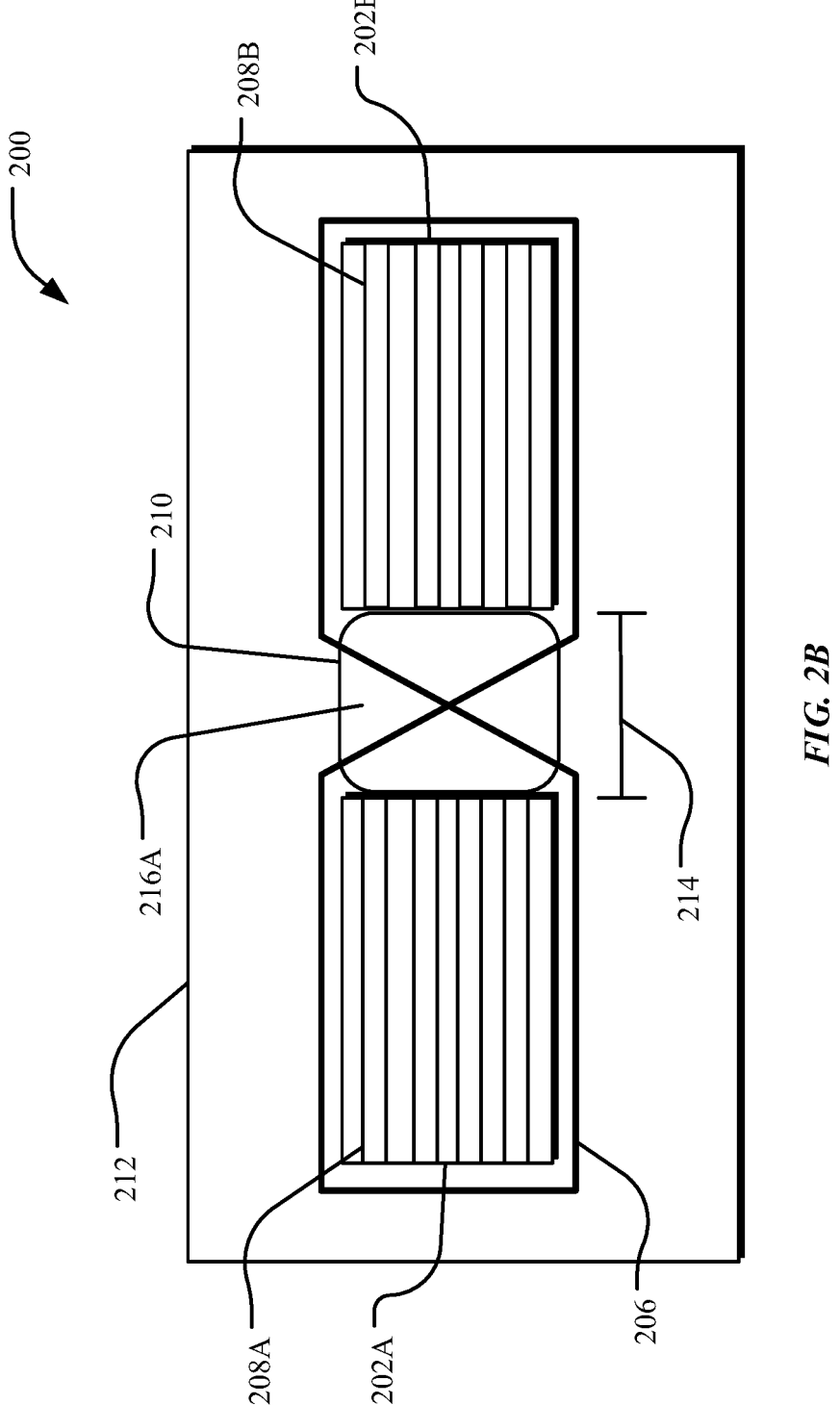
FIG. 2B illustrates a top view of the example core of FIG. 2A.

In one implementation, the first post 202A and the second post 202B are formed from nanocrystalline structures. For example, the first post 202A may include a first plurality of nanocrystalline sheets 204A stacked in a vertical plane, and the second post 202B may include a second plurality of nanocrystalline sheets 204B stacked in the vertical plane. The base 212 may also be formed from stacked nanocrystalline sheets. The base 212 may be planar and disposed along a horizontal X-Y plane. In the example of FIGS. 2A-2B, the Z-axis is vertical and perpendicular to the X-Y plane. The coil windings 206 may be wound about the first post 202A and the second post 202B along X-Z planes perpendicular to X-Y planar surfaces of the first and second plurality of nanocrystalline sheets 204A-204B. The first and second plurality of nanocrystalline sheets 204A-204B are aligned with a direction of magnetic flux from one of the first and second posts 202A-202B to the other. As such, the magnetic flux is substantially in the X-Z plane. The second post 202B is separated from the first post 202A by a spacer 210. The spacer 210 may be made from dielectric material.

The spacer 210 provides mechanical reinforcement to the core 202. In one implementation, the spacer 210 is disposed between the first post 202A and the second post 202B of the core 202. For example, the spacer 210 may cover a center of the base 212 in the distance 214 between the first post 202A and the second post 202B. The spacer 210 may be bonded to the base 212. The coil windings 206 may connect between the first post 202A and the second post 202B along at least one of a top surface 216A or a bottom surface 216B of the spacer 210. The coil windings 206 may be disposed on various portions of the core 202, such as a portion of the base 212, the top surface 216A of the spacer 210, between bottom surface 216B of the spacer 210 and a top surface of the base 212, and/or the like.

The coil winding 206 may be made from a conductive wire (e.g., made of copper or other suitable material), magnet wire, Litz wire, and/or the like. In one implementation, the coil winding 206 is formed from wire wound about the posts 202A-202B. The coil winding 206 may be wound such that an alternating current (AC) generated by the wireless power transmitter 109 and flowing in the wire induces a magnetic flux to deliver energy wirelessly to the accessory 101. In the example shown in FIG. 2A, the coil winding 206 includes a first portion that is wound clockwise around the first post 202A and a second portion that is wound counter-clockwise around the second post 202B. In other examples, the coil winding 206 can be wound about the posts 202A-B in the same direction.

In one implementation, the first plurality of nanocrystalline sheets 204A are bonded by a first plurality of adhesive layers 208A. Similarly, the second plurality of nanocrystalline sheets 204B may be bonded by a second plurality of adhesive layers 208B. The first plurality of adhesive layers 208A and the second plurality of adhesive layers 208B may be interleaved with the first plurality of nanocrystalline sheets 204A and the second plurality of nanocrystalline sheets 204B sheets, respectively. The adhesive layers 208A-208B may be made from pressure sensitive adhesive (PSA), epoxy, and/or similar materials.

Each of the nanocrystalline sheets 204A-204B may have a thickness ranging from approximately 15 μm to 25 μm. In one example, the thickness is 15 μm or greater. In another example, the thickness is 20 μm or greater. In another example, the thickness is 25 μm or less. In another example, the thickness is 20 μm or less. Each of the adhesive layers 208A-208B may have a thickness ranging from approximately 2 μm to 7 μm. In one example, the thickness of the adhesive layers 208A-208B is 5 μm.

Dimensions of the posts 202A-202B relate to a number and dimensions of the nanocrystalline sheets 204A-20B and the adhesive layers 208A-208B. Any number of the nanocrystalline sheets 204A-20B and the adhesive layers 208A-208B may be used to form the nanocrystalline structures of the posts 202A-202B. In one example, four to ten nanocrystalline sheets may be stacked together with an adhesive layer disposed between neighboring nanocrystalline sheets. In another example, each of the posts 202A-202B may include twenty-eight nanocrystalline sheets, such that the post has a width of approximately 3 mm along the Y-axis, a thickness of approximately 0.75 mm along the X-axis, and a length of approximately 16 mm along the Z-axis. In another example, the posts 202A-202B may include twenty to fifty nanocrystalline sheets.

In one implementation, the nanocrystalline sheets 204A-204B may be made from iron-based nanocrystalline material. The nanocrystalline sheets 204A-204B may include silicon (Si) from 8.0 to 9.4 wt %, niobium (Nb) from 4.8 wt % to 6.4 wt %, boron (B) from 1.0 wt % to 2.2 wt %, copper (Cu) from 0.80 wt % to 2.20 wt % with iron (Fe) as a balance.

The core 202, including the base 212 and the posts 202A-202B, may be annealed at elevated temperatures ranging from approximately 300° C. to 550° C. to yield optimized magnetic properties. The annealing promotes alignment of grains of the nanocrystalline material. For example, the core 202 may be annealed at a first temperature (e.g., 300° C.) for a first period of time (e.g., 1 hour) and a second temperature (e.g., 450° C.) higher than the first temperature for a second period of time (e.g., 1 hour) to form an annealed core. The core 202 may be annealed prior to winding the coil 506 about the posts 202A-202B. The core 202 has a high magnetic permeability of at least 10,000 in the X-Z plane relative to a low magnetic permeability of less than 10 in the X-direction, as well as favorable (negligible) eddy current loss.

Turning to FIG. 3, a core configuration 300 including a post forming a slab 302 is illustrated. In one implementation, the slab 302 is formed from a nanocrystalline structure. The slab 302 may include a plurality of nanocrystalline sheets 304 stacked in vertically with planar surfaces in an X-Y plane. One or more coils are wound around the post 302 to form coil windings 306. The coil windings 306 are would along X-Z planes perpendicular to the X-Y planar surfaces. The coil windings 306 includes a first end and a second end.

The plurality of nanocrystalline sheets 304 form a nanocrystalline-based wireless power transfer core. The plurality of nanocrystalline sheets 304 may be bonded by a plurality of adhesive layers 308. The plurality of adhesive layers 308 may be interleaved with the plurality of nanocrystalline sheets 304. The plurality of adhesive layers 308 may be made from PSA, epoxy, and/or similar materials. In one implementation, the nanocrystalline sheets 304 may be made from iron-based nanocrystalline material. The nanocrystalline sheets 304 may include silicon (Si) from 8.0 to 9.4 wt %, niobium (Nb) from 4.8 wt % to 6.4 wt %, boron (B) from 1.0 wt % to 2.2 wt %, copper (Cu) from 0.80 wt % to 2.20 wt % with iron (Fe) as a balance.

In one implementation, the core configuration 300, including the slab 302, may be annealed at elevated temperatures ranging from approximately 300° C. to 550° C. to optimize magnetic properties. The annealing promotes alignment of grains of the nanocrystalline material. For example, the core 302 may be annealed at a first temperature (e.g., 300° C.) for a first period of time (e.g., 1 hour) and a second temperature (e.g., 450° C.) higher than the first temperature for a second period of time (e.g., 1 hour) to form an annealed core. The slab 302 may be annealed prior to winding the coil winding 306 about the slab 302. The slab 302 has a high magnetic permeability of at least 10,000 in the X-Z plane relative to a low magnetic permeability of less than 10 in the X-direction perpendicular to X-Z plane, as well as favorable (negligible) eddy current loss.

As described herein, nanocrystalline sheets of the various core configurations may be stacked to form a magnetic component. The magnetic component may include one or more nanocrystalline structures, such as one or more posts, which may be used to form a slab. The nanocrystalline sheets may be stacked in a vertical and/or horizontal direction. For example, the nanocrystalline sheets of a base, slab, and/or one or more posts may be planar and stacked along parallel planes. The nanocrystalline structures may be formed through additive printing or similar techniques. The magnetic component has a high in-plane magnetic permeability relative to a through-place magnetic permeability. For example, each of the nanocrystalline sheets may have a magnetic permeability of approximately 10,000 to 15,000 in a plane parallel to the nanocrystalline sheets and a magnetic permeability of approximately 10 or less in a direction perpendicular to the nanocrystalline sheets. The magnetic component has favorable (negligible) eddy current loss in operating frequencies ranging from approximately 100 kHz to 400 kHz. In some examples, the nanocrystalline sheets may be rolled to create cracks between nanocrystalline grains, which may reduce the in-plane magnetic permeability. The core may include nanocrystalline sheets that are cracked, with the nanocrystalline sheets of the base and the nanocrystalline sheets of the posts oriented planar and staked along parallel planes. While described herein with respect to wireless power assemblies of the electronic device 102 and/or the accessory 101, it will be appreciated that the magnetic component can be used as core for other applications.

Any ranges cited herein are inclusive. The terms "substantially" and "approximately" and "about" and similar terms are used to describe and account for small fluctuations. For example, these terms can refer to ±5%. It is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An apparatus comprising:
a base having a planar surface;
one or more posts extending from the planar surface of the base to form a core, each of the one or more posts formed from a plurality of nanocrystalline sheets, the plurality of nanocrystalline sheets of each of the one or more posts being oriented in planes perpendicular to the planar surface of the base; and
one or more coils wound around each of the one or more posts to form coil windings.

2. The apparatus of claim 1, wherein the plurality of nanocrystalline sheets is aligned with a direction of magnetic flux generated by a wireless charging assembly including the core.

3. The apparatus of claim 1, wherein the plurality of nanocrystalline sheets is bonded by and interleaved with a plurality of adhesive layers.

4. The apparatus of claim 3, wherein the plurality of adhesive layers comprises pressure sensitive adhesive (PSA) or epoxy.

5. The apparatus of claim 1, wherein the base comprises a second plurality of nanocrystalline sheets.

6. The apparatus of claim 5, wherein each of the second plurality of nanocrystalline sheets of the base comprises 20 to 50 sheets.

7. The apparatus of claim 1, wherein the plurality of nanocrystalline sheets for each of the one or more posts comprises 20 to 50 sheets.

8. The apparatus of claim 1, wherein each of the plurality of nanocrystalline sheets has a magnetic permeability of 10,000 to 15,000 in a plane parallel to the sheet and a magnetic permeability of 10 or less in a direction perpendicular to the sheet.

9. The apparatus of claim 1, wherein the one or more posts includes a first post and a second post.

10. The apparatus of claim 9, wherein the apparatus comprises a dielectric spacer disposed over the base between the first post and the second post.

11. The apparatus of claim 10, wherein the coil windings extend to be above the dielectric spacer.

12. The apparatus of claim 10, wherein the coil windings extend between a surface of the dielectric spacer and a surface of the base.

13. The apparatus of claim 1, wherein the plurality of nanocrystalline sheets are iron-based nanocrystalline sheets.

14. The apparatus of claim 13, wherein the iron-based nanocrystalline sheets comprises Si from 8.0 to 9.4 wt %, Nb from 4.8 wt % to 6.4 wt %, B from 1.0 wt % to 2.2 wt %, and Cu from 0.80 wt % to 2.20 wt %, with Fe as a balance.

15. The apparatus of claim 1, wherein each of the plurality of nanocrystalline sheets has a thickness from 15 μm to 20 μm.

16. The apparatus of claim 1, further comprising:
a wireless charging assembly including the core, the wireless charging assembly configured to generate a magnetic flux.

17. The apparatus of claim 16, wherein the wireless charging assembly is housed in an enclosure formed by a plurality of peripheral surfaces.

18. The apparatus of claim 16, wherein the wireless charging assembly provides power wirelessly to an accessory.

19. The apparatus of claim 18, wherein the power is wirelessly provided to the accessory at a frequency of 100 kHz to 400 kHz.

20. An apparatus comprising:

a plurality of nanocrystalline sheets, each of the plurality of nanocrystalline sheets including an X-Y planar surface, the plurality of nanocrystalline sheets forming a nanocrystalline-based wireless power transfer core; and a wireless power transfer coil wound circumferentially about the nanocrystalline-based wireless power transfer core along X-Z planes perpendicular to the X-Y planar surfaces.

* * * * *